United States Patent
Obrecht et al.

(10) Patent No.: US 9,920,741 B2
(45) Date of Patent: Mar. 20, 2018

(54) WIND TURBINE BLADE HAVING A GEOMETRIC SWEEP

(75) Inventors: John M. Obrecht, Louisville, CO (US); Lasse Gilling, Vejle (DK); Henrik Fredslund Hansen, Aalborg (DK); Scott J. Johnson, Boulder, CO (US); Ryan A. Sievers, Lyons, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 1687 days.

(21) Appl. No.: 13/357,661

(22) Filed: Jan. 25, 2012

(65) Prior Publication Data

US 2013/0189116 A1    Jul. 25, 2013

(51) Int. Cl.
 *F01D 5/14* (2006.01)
 *F03D 1/06* (2006.01)

(52) U.S. Cl.
 CPC ...... *F03D 1/0675* (2013.01); *F05B 2200/222* (2013.01); *F05B 2240/311* (2013.01); *F05B 2250/71* (2013.01); *Y02E 10/721* (2013.01); *Y02E 10/726* (2013.01)

(58) Field of Classification Search
 CPC .................................................. F03D 1/0633
 USPC ............. 416/223 R, 235, 237, 238, 242, 243
 See application file for complete search history.

(56) References Cited

U.S. PATENT DOCUMENTS

| | | | |
|---|---|---|---|
| 5,584,661 A | 12/1996 | Brooks | |
| 6,899,523 B2 | 5/2005 | Wobben | |
| 7,118,338 B2 | 10/2006 | Moroz et al. | |
| 7,153,090 B2 | 12/2006 | DeLeonardo et al. | |
| 7,344,360 B2 * | 3/2008 | Wetzel | 416/238 |
| 7,476,086 B2 | 1/2009 | Wadia et al. | |
| 7,540,716 B2 * | 6/2009 | Wobben | 416/228 |
| 7,690,895 B2 | 4/2010 | Moroz | |
| 7,802,968 B2 | 9/2010 | Jacobsen | |
| 7,832,985 B2 | 11/2010 | Rochholz | |
| 7,914,259 B2 | 3/2011 | Godsk | |
| 7,946,826 B1 * | 5/2011 | Koegler et al. | 416/238 |

(Continued)

FOREIGN PATENT DOCUMENTS

| | | |
|---|---|---|
| CN | 1755103 A | 4/2006 |
| CN | 101520027 A | 9/2009 |

(Continued)

OTHER PUBLICATIONS

Ashwill, et al., Sweep Twist Adaptive Blade, Presented at EWEC-07, Milan, Italy, May 7, 2007, Sandia National Laboratories.

(Continued)

*Primary Examiner* — Christopher Verdier
*Assistant Examiner* — Kayla McCaffrey

(57) ABSTRACT

A swept wind turbine blade (20) includes a blade body (24) extending along a length between a root (26) and a tip (28) of the blade (20). A pitch axis (36) extends through the root (26) of the blade (20). A reference line (48) defines a deviation from the pitch axis (36) and corresponds to a swept shape of the blade (20) along its length. The reference line (48) has a zero sweep at the root (26), a zero slope at the root (26), and a positive curvature (66) along a segment within 25% of the length from the root (26) to the tip (28) of the blade (20).

8 Claims, 3 Drawing Sheets

(56) References Cited

U.S. PATENT DOCUMENTS

| | | | |
|---|---|---|---|
| 7,997,875 | B2 | 8/2011 | Nanukuttan et al. |
| 2006/0067828 | A1 | 3/2006 | Hong et al. |
| 2009/0220340 | A1 | 9/2009 | Pierce et al. |
| 2009/0297355 | A1 | 12/2009 | Herr et al. |
| 2009/0324416 | A1* | 12/2009 | Bonnet ............... 416/223 R |
| 2010/0143138 | A1 | 6/2010 | Marvin et al. |
| 2010/0296940 | A1 | 11/2010 | Zuteck |
| 2011/0042524 | A1 | 2/2011 | Hemmelgarn et al. |
| 2011/0052404 | A1 | 3/2011 | Zuteck |
| 2011/0052407 | A1 | 3/2011 | Zuteck |
| 2011/0052408 | A1 | 3/2011 | Zuteck |
| 2011/0142677 | A1 | 6/2011 | Nanukuttan et al. |
| 2011/0211966 | A1 | 9/2011 | Watts et al. |

FOREIGN PATENT DOCUMENTS

| | | |
|---|---|---|
| CN | 101619708 A | 1/2010 |
| DE | 19738278 A1 | 3/1999 |
| DE | 10300284 A1 | 7/2004 |
| DE | 102006034828 A1 | 7/2006 |
| EP | 2096300 A2 | 9/2009 |
| EP | 2141355 A2 | 1/2010 |
| EP | 2169217 A1 | 3/2010 |
| EP | 2761170 A1 | 8/2014 |
| WO | 2012164045 A1 | 12/2012 |

OTHER PUBLICATIONS

Verelst et al., Load Consequences When Sweeping Blades—A Case Study of a 5 MW Pitch Controlled Wind Turbine, Riso-R-1724(EN), Aug. 2010.

Achatz R: "Innovations in Partnership"; Siemens Innovation Day 2011.

Geränderte Figur 4 zur US 2006/0067828 A1.

NACA Research Memorandum: "A wind-tunnel investigation of the aerodynamic characteristics of a full-scale sweptback propeller and two related straight propellers"; Langley Aeronautical Laboratory Langley Field, VA.; National Advisory Committee for Aeronautics; Washington / Jan. 1, 1951.

Ashwill T. D. et al.: "Development of the Sweep-Twist Adaptive Rotor (STAR) Blad"; 48th AIAA Aerospace Sciences Meeting Including the New Horizons Forum and Aerospace Exposition, Orlando, Florida, Jan. 4, 2010; pp. 1-13.

Larwood S. M. : "Dynamic Analysis Tool Development for Advanced Geometry Wind Turbine Blades"; Dissertation in Mechanical and Aeronatical Engineering, University of California, 2009; pp. 1-148.

Hansen M. H: "Aeroelastic properties of backward swept blades" 49th AIAA Aerospace Sciences Meeting including the New Horizons Forum and Aerospace Exposition, Orlando, Florida, Jan. 4, 2011; pp. 1-19 / Apr. 1, 2011.

* cited by examiner

WIND TURBINE BLADE HAVING A GEOMETRIC SWEEP

FIELD OF THE INVENTION

The present invention relates to wind turbine blades, and more particularly to torsionally-flexible swept wind turbine blades and to methods for making the same.

BACKGROUND OF THE INVENTION

Typically, wind turbines include a rotor having a plurality of rotor blades mounted thereon; a drive train and a generator housed in a nacelle; and a tower. The nacelle and the rotor are typically mounted on top of the tower. In operation, the plurality of blades of the rotor receive energy from the wind and convert the wind energy into a rotational torque that is used to drive the generator, which is rotationally coupled to the rotor through the drive train. Aeroelastic wind turbine blades have been investigated for their potential ability to increase the energy production for a wind turbine by forming blades that passively twist to reduce loads created by flow-field perturbations (turbulence, shear, yaw, etc.), thereby making it possible to design larger rotors for normal operating conditions that will increase the output of the wind turbine.

Known aeroelastic blades include those having at least a backward sweep relative to a reference line extending along the blade length on an outboard section of the blades. The backward sweep enables aerodynamic forces to act at a distance from the local structural axis of the blade, which, in turn, creates a local twisting moment about the structural axis. The twisting moment naturally gives rise to a self-correcting induced twist of the blade toward a lower aerodynamic angle of attack, thus passively averting abnormally high lift forces during off-normal conditions.

BRIEF DESCRIPTION OF THE DRAWINGS

The invention is explained in the following description in view of the drawings that show.

DETAILED DESCRIPTION OF THE INVENTION

The present inventors have recognized that the twisting moment developed in an aeroelastic blade can be detrimental to the wind turbine's operation because large moments applied at the root produce stress on the hydraulic blade pitch control system and may lead to a reduced lifetime of constituent parts. Further, the present inventors have innovatively developed a torsionally-flexible swept wind turbine blade having an improved sweep shape. The blade provides an aeroelastic response to passively induce a self-correcting, inherently stable torsional response, while minimizing the developed local twisting moment at the blade root. Advantageously, reduced loads on the blade enable larger rotors to be manufactured, which may provide greater energy output for the wind turbine. The swept blades described herein also provide a smoother gradient profile for twisting moments along the blade length compared to known swept blades. A smoother gradient profile is more favorable from a structural point-of-view as large gradients in twisting moments are mechanically undesirable.

Figure 1:
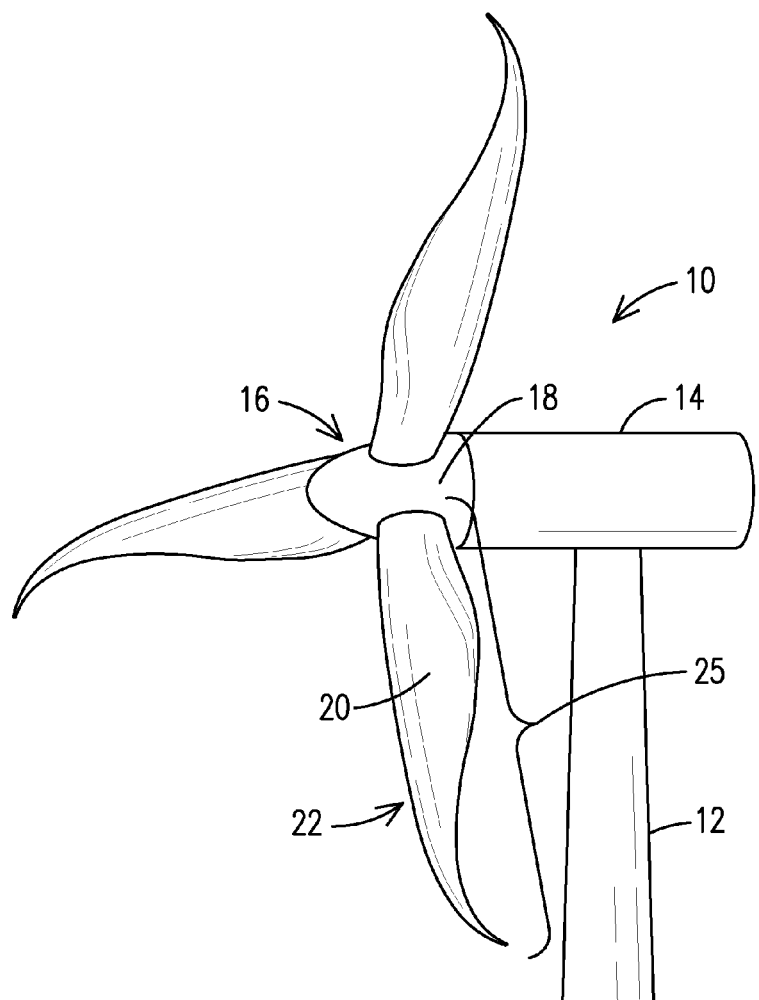
FIG. 1 is a perspective view of a wind turbine having a swept blade in accordance with an aspect of the present invention.
Figure 2:
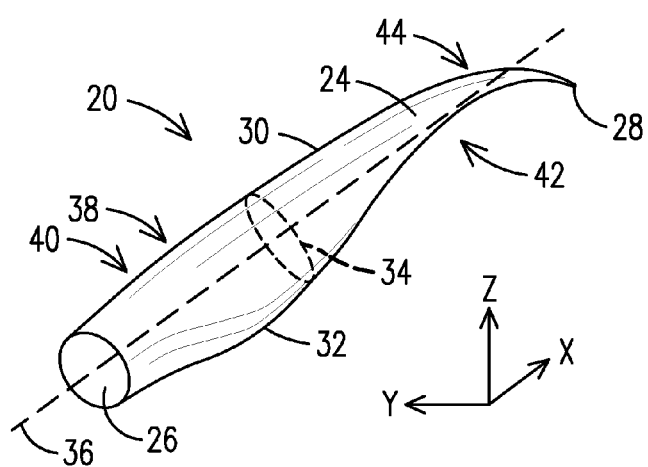
FIG. 2 is a perspective view of a swept wind turbine blade in accordance with an aspect of the present invention.

Referring now to the figures, FIG. 1 illustrates a wind turbine 10 having a tower 12, a nacelle 14 mounted on the tower 12, and a rotor 16 having a hub 18 and a plurality of swept blades 20 having a predetermined sweep shape 22. Referring to FIG. 2, there is shown an exemplary swept wind turbine blade 20 having a body 24 defining a locus of x, y, and z coordinates along an x, y, and z axis. As shown in FIGS. 1-2, the body 24 extends along a length 25 between a root 26 and a tip 28 of the blade 20, as well as between a leading edge 30 and a trailing edge 32 of the blade 20. The body 24 defines a plurality of airfoil cross-sections 34 between the leading edge 30 and the trailing edge 32. A pitch axis 36 extends in the spanwise (x) direction from the root 26 through the body 24 of the blade 20 oriented normal to the blade root face. The sweep shape 22 comprises an inboard sweep 38 in an inboard region 40 of the blade 20 and an aft sweep 42 in an outboard region 44 of the blade 20. Typically, the inboard region 40 comprises 25% or less of a span (length from root 26 to tip 28) of the blade 20 in the x direction. The outboard region 44 comprises the remainder of the span of the blade 20.

Figure 3:
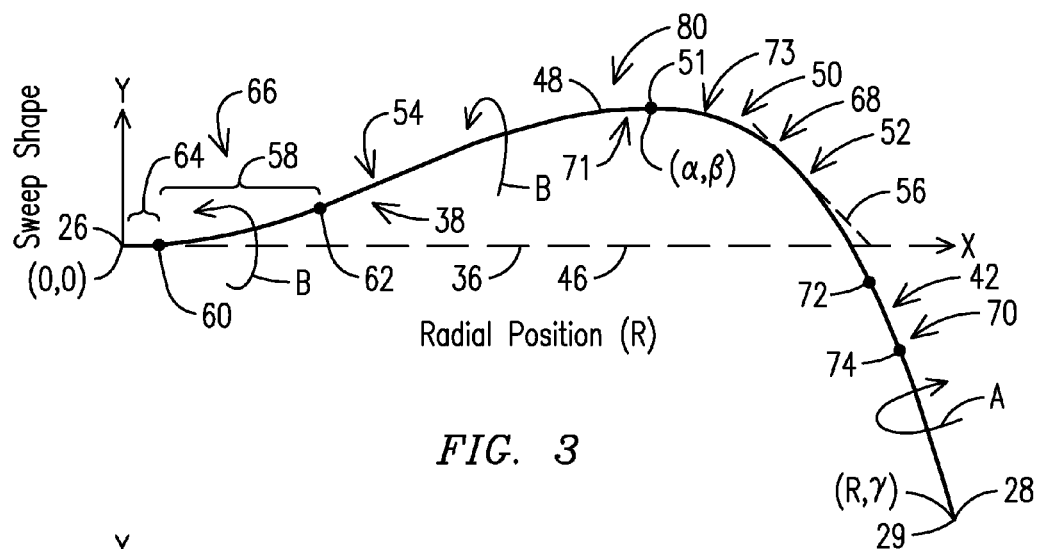
FIG. 3 shows a profile of a reference line for a swept blade relative to an axis of a straight blade in accordance with an aspect of the present invention.

FIG. 3 shows an axis along a radial position of a typical prior art straight blade 46 (dotted line along x axis) and an exemplary swept blade 20 having an inboard sweep 38 and an aft sweep 42 in respective inboard and outboard regions 40, 44 of the blade 20 as described above. The term "sweep" refers to a forward or rearward deviation of blade position away from a reference line of a straight blade position in its plane of rotation. In FIG. 3, the x axis (reference line of a straight blade) is coextensive with a pitch axis 36 for the blade 20. When a wind gust strikes the swept blade 20 with the aft sweep 42, an increase in out-of-plane (flapwise) loading produces a pitching moment about sections in the inboard region 40. This pitching moment acts to induce portions of the outboard region 44 of the swept blade 20 to twist the leading edge 30 of the blade 20 into the wind as shown by arrow A so as to reduce an aerodynamic angle of attack of those sections, thereby ameliorating peak transient loads that the swept blade 20 would otherwise experience. Further, as shown, the inboard sweep 38 of the swept blade 20 is configured to twist in a counter-direction as shown by arrow B to cancel out local twisting moments about the pitch axis 36 near the root 26 of the blade 20.

In accordance with an aspect of the present invention, the sweep shape 22 corresponds to a reference line extending along or through the blade body upon which the outer geometry may be established. Referring again to FIG. 3, there is shown an exemplary reference line 48 that defines a deviation from the pitch axis 36 and corresponds to a sweep shape 22 (shown in FIG. 1) along the length 25 of the swept blade 20 (shown as Radial Position (R)). The reference line 48 has a sweep shape 50 and provides an axis about which a plurality of airfoil sections may be aligned in any suitable configuration. Once the reference line 48 is established, the blade surface and the outer geometry of the blade body 24 of the swept blade 20 may be established according to well-known methods in the art.

In one embodiment, for example, the outer geometry may be determined by skewing or offsetting a plurality of airfoil cross-sections, e.g. airfoils 34 (FIG. 2), along the reference line 48. Offsetting refers to aligning blade cross-section planes along the reference line 48 such that the blade cross-sections are perpendicular to a longitudinal axis extending through the blade 20, e.g., the pitch axis 36. On the other hand, skewing involves aligning blade cross-sections along the reference line 48 such that each blade cross-section follows the sweep shape 50 and lies on a plane normal to the reference line's tangent at that point on the reference line 48. Alternatively, once the reference line 48 is established, further techniques may be utilized to design the outer geometry of the body 24 (shown in FIG. 2) of the swept blade 20 such as computer-assisted drawing (CAD) lofting techniques, in which cross-sectional planes are smoothly joined together into a three-dimensional surface through the use of CAD computer software routines (such as splines, etc.). In alternate embodiments, the outer geometry of the blade body 24 may first be established according to the function(s) described herein and the reference line 48 may be ascertained from the shape of the blade body 24.

Without limitation, the reference line 48 of the swept blade 20 may represent an elastic axis, a quarter chord line, a center of mass line, a shear center line, a leading edge line, a trailing edge line, or any other axis that is swept relative to a reference line of a straight blade. As shown in FIG. 3, the sweep shape 50 of the reference line 48 is shown along an x-axis representing a span (length 25) of the blade 20 from the root 26 to the tip 28. The reference line 48 may include a point of origin at point (0, 0) representative of the root 26 of the blade 20, a transition point 51 of the sweep shape 50 at point ($\alpha$, $\beta$), which is at or proximate to a point where a slope changes sign, and a terminal end at point (R, $\gamma$) representative of a tip sweep extent 29 of the blade 20. Referring to FIGS. 2-3, the reference line 48 has a shape 50 that corresponds to the inboard sweep 38 in the inboard region 40 of the blade 20 and the aft sweep 42 in the outboard region 44 of the blade 20, each sweep shape relative to a pitch axis 36.

The sweep shape 50 of the reference line 48 comprises a slope 52 at any point along the reference line 48 and a degree of curvature 54. The slope 52 is defined by a line 56 that is tangent to the sweep shape 50 at any particular point. The curvature 54 refers to a local spatial rate of change in slope; for example, in a first region 58 of the curvature 54, there is an increase in slope from point to point in direction from root 26 to tip 28. As can be seen with reference to FIG. 3, the reference line 48 comprises an inboard sweep 38 and an aft sweep 42. The inboard sweep 38 includes the first curvature region 58, which has at least a first point 60 having a zero slope and a second point 62 outboard from the first point 60 along the reference line 48 having a positive slope. Since there is at least a positive slope change from the first point 60 to the second point 62 in an area of the first curvature region 58, the inboard sweep 38 of the reference line 48 (and thus typically also the blade 20) comprises a positive curvature 66 at a segment between at least exemplary points 60, 62. Put another way, between the root 26 and a further outboard point 62 on the reference line 48, there is a segment (e.g., first curvature region 58) with a forward change in the y direction with an increasing outboard position in the x direction with a simultaneous forward rate of change of slope.

The positive curvature 66 may have a starting point at any point within the inboard region 40 of the blade 20 having a zero slope. In one embodiment, the starting point is within the first 25% of the length 25 of the blade 20. In particular embodiment, the positive curvature 66 has a starting point at the root 26 of the blade 20. In another embodiment, the slope 52 is negative at the root 26 with positive curvature. The slope 52 may become zero at some point and turn positive further outboard, all the while retaining positive sweep curvature.

In the embodiment shown in FIG. 3, the reference line 48 comprises a zero sweep at the root 26, a zero slope at the root 26, and a positive curvature 66 along a segment within 25% of the length 25 from the root 26 to the tip 28 of the blade 20. For example, the first point 60 is located within a first segment 64 having a zero slope, although it is appreciated that the present invention is not so limited to a segment forward of the root 26 having a zero slope. It is critical only that the positive curvature 66 of the reference line 48 starts from the root 26 or passes through a point outboard from the root 26 having a zero slope.

Figure 4:
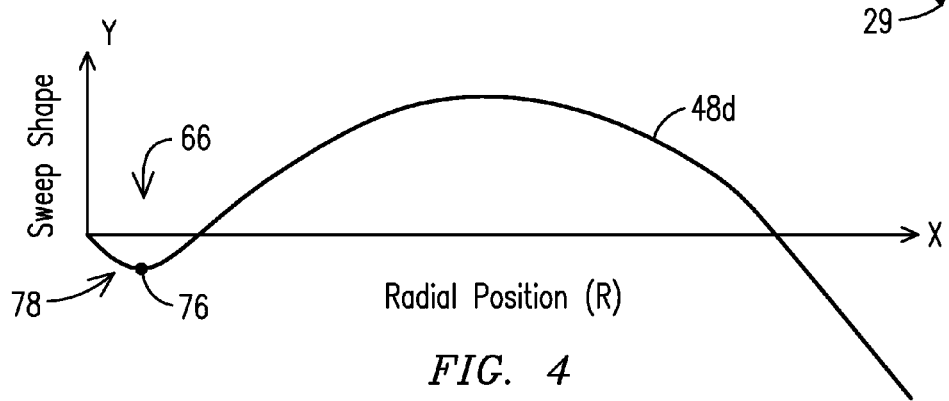
FIG. 4 shows a profile of a reference line for a swept blade in accordance with another aspect of the present invention.

Referring again to FIG. 3, the reference line 48 comprises a second (negative) curvature region 68 along a second portion 70 of the length 25 of the reference line 48 between a first point 72 and a second point 74 (having a more negative slope than the first point 72). The second portion 70 may define a different, an overlapping, or the same length or area of the reference line 48 as second portion 73 described below. Typically, the second portion 70 is within the outboard region of the blade 20 following the positive curvature 66, although the present invention is not so limited. In an alternate embodiment, however, as shown in FIG. 4, it is contemplated that the reference line, e.g., reference line 48$d$, may also include a continuous curvature (continuous curve) 78 including a point 76 (or segment) outboard of the root 26 having a negative forward sweep while retaining a positive curvature 66. It is only necessary that there exists at least a positive curvature along a segment within 25% of the length 25 (Radial Position (R)) from the root 26 to the tip 28 of the blade 20.

In certain embodiments, the curvature 54 of the reference line 48 comprises a continuous curvature (continuous curve) 80 as shown in at least FIG. 3. Since the outer geometry of the blade 20 will typically correspond to the shape of the reference line 48, the blade 20 also includes the continuous curvature 80. Blades having a continuous curvature shape in accordance with the present invention advantageously provide a smoother gradient profile for twisting moments near the root 26 of the blade 20 as compared to known swept blades by gradually tending towards zero moment toward the root 26. A smoother gradient profile is more favorable from a structural point-of-view as large gradients in twisting moments are undesirable.

The parameters of the reference line 48, e.g., the sweep shape 50, slope 52 and a degree of the curvature 54 may be defined by one or more mathematical functions. In one embodiment, the reference line 48 is defined by a single function. In a particular embodiment, the swept wind turbine blade 20 is established according to two or more mathematical functions. For example, as shown in FIG. 3, the reference line 48 comprises a first portion 71 defined by a first function and a second portion 73 defined by a second function different from the first function along a second portion of the length adjoining the first function at a transition point (shown at α, β by reference numeral 51).

Advantageously, the reference line 48 comprises a continuous curvature 80 when the transition point between any two distinct functions, each defining a portion of the reference line, have equivalent curvature at the transition point of the two functions. For example, the reference line 48 comprises a continuous curvature 80 when a curvature of a first portion 71 of the reference line 48 terminating at the transition point 51 and represented by a first function and a curvature of a second portion 73 of the reference line 48 terminating at the transition point 51 and represented by a second function are equal. In one embodiment, the reference line 48 further comprises a continuous slope at the transition point 51 such that a slope of the first function is equal to a slope of the second function at the transition point 51 of the first function and the second function.

Figure 5:
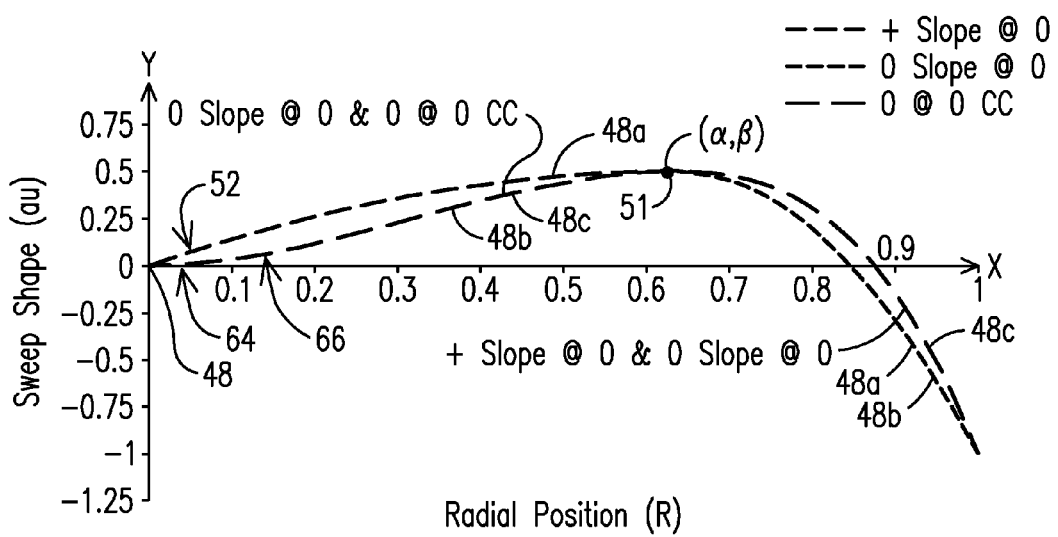
FIG. 5 shows differences in sweep shapes of three different reference lines in accordance with an aspect of the present invention.

For the sake of further illustration (and without limitation), there are provided three exemplary sweep shape methods for comparison herein. As shown in FIG. 5, in one embodiment, there is shown a first reference line 48a that is swept according to a Positive Slope at Zero ("+Slope @ 0") method, wherein the reference line 48a has a positive slope 52 that immediately begins to increase from the root 26 of the blade 20. It is noted that a disadvantage of this method of sweeping is that the local accumulated twisting moments that are created from aerodynamic forces acting on the blade become very large near the root section. These accumulated twisting moments may be structurally undesirable. In another embodiment shown in FIG. 5, there is shown a second reference line 48b that may be formed according to a Zero Slope at Zero ("0 Slope @ 0") method having at least a first segment 64 having a zero slope and at least a first region, e.g., first curvature region 58, having a positive curvature 66 (as were shown in FIG. 3). Third, in yet another embodiment shown in FIG. 5, there is shown a third reference line 48c that may be formed according to a Zero Slope at Zero Continuous Curvature ("0 Slope @ 0 CC" method that adds the previously discussed curvature continuity 80 to the "0 Slope @ 0" method (reference line 48b). As can be seen, references lines 48b and 48c overlap until both lines reach point (α, β). Thereafter, reference lines 48a and 48b overlap while reference line 48c does not overlap with any other lines.

As discussed above, the sweep shape 50 for the reference line 48 of the blade 20 (and thus typically the corresponding sweep shape 22 of the blade 20) may be defined by one or more mathematical functions, such as a polynomial function. In one embodiment, the polynomial function is a piecewise polynomial function comprising two or more polynomial functions. Referring again to FIG. 5, for example, the sweep shapes of the reference lines may be defined by two or more functions. In the embodiments shown in FIG. 5, the first function for line 48c, for example, defines the sweep shape 50 from point (0, 0) at the root 26 to point 51 (α,β) and at least a second function defines the sweep shape 50 from point 51 (α, β) to (R, γ) to the tip 28 of the blade 20.

For each of the functions representing the sweep shape 50 of references lines 48a, 48b, and 48c, the following boundary conditions exist.

| | |
|---|---|
| $y_1(0) = 0$ | Originate at origin (0, 0): blade root |
| $y_1(\alpha) = \beta$ | Pass through (α, β) |
| $y_2(\alpha) = \beta$ | Sweep shape is functionally continuous at (α, β) |

-continued

| | |
|---|---|
| $y_1'(\alpha) = 0$ | Forward-most point of shape 50 is located at (α, β) |
| $y_2'(\alpha) = 0$ | Slope is functionally continuous at (α, β) |
| $y_2(R) = \gamma$ | Shape terminates at (R, γ) |

In addition, the function for the reference line 48a (the "+Slope @ 0" method) further includes the following definitions:

| | |
|---|---|
| $a_3 = 0$ | $y_1$ is quadratic |
| $b_3 = 0$ | $y_2$ is quadratic |

The "+Slope @ 0" method uses two quadratic functions to describe its sweep shape and allows the freedom for the sweep shape to have a positive slope at the origin.

In addition, the functions for the reference line 48b (the "0 Slope @ 0" method) further include the definitions below:

| | |
|---|---|
| $y_1'(0) = 0$ | Zero slope at origin (0, 0) |
| $b_3 = 0$ | $y_2$ is quadratic |

The "0 Slope @ 0" method uses one cubic function and one quadratic function to describe the sweep shape and allows the freedom for the sweep shape to have a zero slope at the origin.

Further, the functions for the reference line 48c (the "0 Slope @ 0 CC" (continuous curvature) method further include the definitions below. The "0 Slope @ 0 CC" method also uses two cubic functions to describe the sweep shape and allows the freedom for the sweep shape to have a zero slope at the origin, as well as include a continuous curvature.

| | |
|---|---|
| $y_1'(0) = 0$ | Zero slope at origin (0, 0) |
| $y_1''(\alpha) = y_2''(\alpha)$ | Curvature is functionally continuous at (α, β) |

Critically, the continuous curvature 80 provides a reference line having two points at either side of the point (α,β) where the functions are equivalent in slope, function, and curvature. In this way, a blade 22 constructed so as to have an outer geometry with a continuous curvature 80 as with reference line 48c provides a smoother gradient profile for twisting moments near the root 26 of the blade 22 relative to known swept blades by gradually tending towards zero moment toward the root 26.

Figure 6:
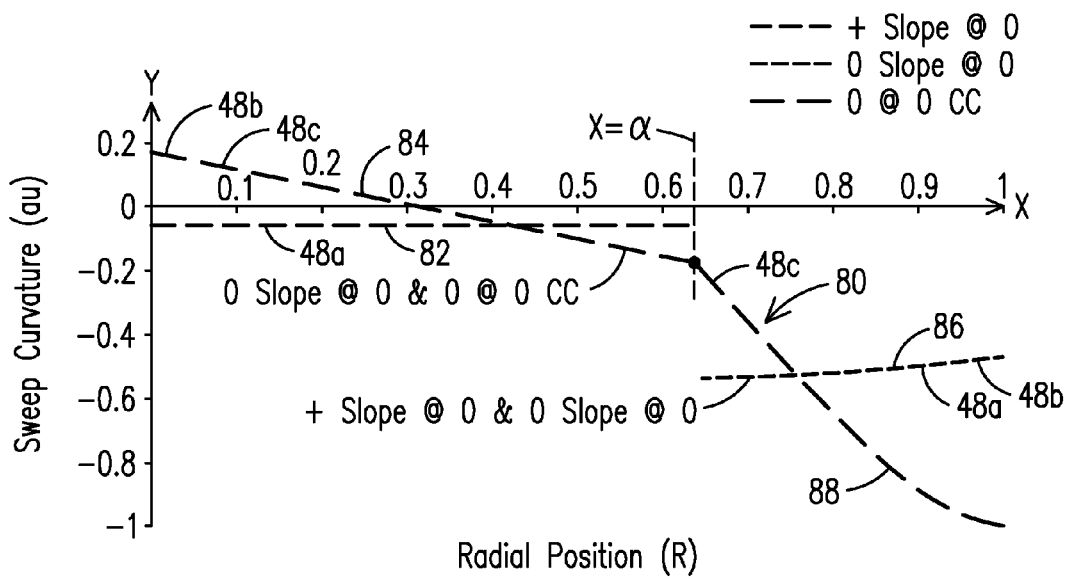
FIG. 6 shows differences in blade curvature for three different sweep shapes in accordance with an aspect of the present invention.

It is contemplated that any parameterization of a sweep shape may be utilized that includes the above definitions. Though FIG. 5 and the above description both refer to a piecewise polynomial function, other functions may be utilized to define the sweep shape of the reference lines, such as a continuous polynomial parameterization (which would also have a continuous curvature), a discrete Fourier Series (which would also have a continuous curvature), a piecewise Fourier Series (which may or may not have continuous curvature), and other piecewise expressions that do not necessarily utilize polynomial or Fourier series expressions Referring now to FIG. 6, the continuous curvature 80 of reference line 48c is clearly shown, particularly when contrasted with the curvature of the reference lines 48a, 48b along a radial position (spanwise length) of an exemplary blade 20. As shown, only the reference line 48c has a continuous curvature 80. Specifically, the reference line 48a (corresponding to the "+Slope at 0" method) includes a segment 82 to point (α,β) that has little to no change in curvature. In addition, reference line 48*b* follows the curvature of reference line 48*c* to point (α,β) as shown by segment 84, but the reference line 48*b* does not have a continuous curvature at x=α. Instead, the reference line 48*a* and reference line 48*b* have a substantially similar or identical curvature after x=α as shown by segment 86. As such, only reference line 48*c* has a continuous curvature and does not change in functional form after point (α,β) as shown by segment 84 and segment 88.

Figure 7:
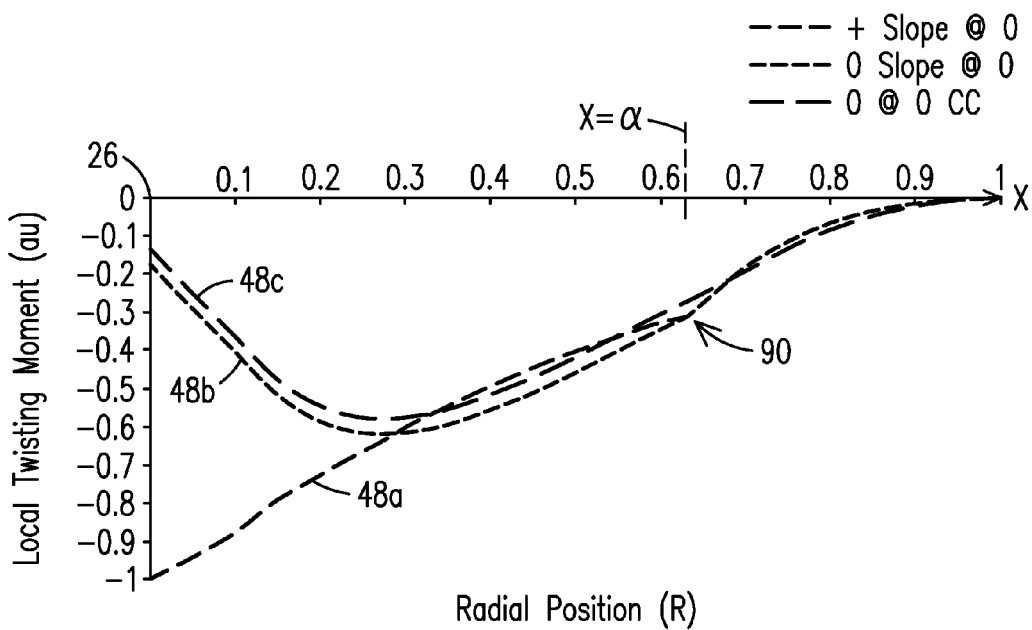
FIG. 7 shows differences in local twisting moments for blades with three different sweep shapes in accordance with an aspect of the present invention.

FIG. 7 shows the corresponding local accumulated twisting moment for exemplary swept blades fabricated according to reference lines 48*a*, 48*b*, and 48*c*. First, as shown, the reference lines 48*b* and 48*c* (formed according to the "0 Slope @ 0" and "0 Slope @ 0 CC" methods respectively) gradually tend towards zero moment near the root 26 in stark opposition to reference line 48*a* (formed by the '+Slope@0' method). As mentioned, this continuous twisting-moment distribution, which gradually tends towards zero moment toward the root, is much more structurally favorable. Further critically, in comparing the "0 Slope @ 0" method and the "0 Slope @ 0 CC" method (reference lines 48*b* and 48*c*), the "0 Slope @ 0 CC" method has a twisting-moment distribution without a kink 90 at the functional divide (x=α~0.63), and thus a much smoother gradient profile favorable to the blade structure. In this way, blades 20 using the reference lines 48*b* and 48*c* particularly to guide their geometries are well able to cancel out twisting moments resulting from the passive twisting of the blade due to the aft sweep 42 of the blade 20 (shown in FIG. 2).

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A swept wind turbine blade comprising:
   a blade body extending along a length between a root and a tip of the blade;
   a pitch axis extending through the root of the blade;
   a reference line defining a deviation from the pitch axis corresponding to a swept shape of the blade along its length;
   wherein the reference line comprises:
      a zero sweep at the root;
      a zero slope at the root;
      a positive curvature along a segment within 25% of the length from the root to the tip of the blade;
   wherein the reference line comprises a positive curvature at the root.

2. The swept wind turbine blade of claim 1, wherein the reference line further comprises:
   a first curvature defined by a first function along a first portion of the length;
   a second curvature defined by a second function different from the first function along a second portion of the length adjoining the first function at a transition point;
   wherein a slope of the first curvature and a slope of the second curvature are equal at the transition point.

3. The swept wind turbine blade of claim 1, wherein the reference line further comprises:
   a first curvature defined by a first function along a first portion of the length;
   a second curvature defined by a second function different from the first function along a second portion of the length adjoining the first function at a transition point;
   wherein a slope of the first curvature and a slope of the second curvature are equal at the transition point.

4. The swept wind turbine blade of claim 3, wherein the first curvature extends from a point on a segment having a zero slope forward of the root.

5. The swept blade of claim 1, further comprising a negative curvature outboard from the positive curvature along the length.

6. The swept wind turbine blade of claim 1, wherein the reference line comprises a member selected from the group consisting of an elastic axis, a quarter chord line, a center of mass line, a shear center line, a leading edge line, and a trailing edge line of the blade.

7. A wind turbine rotor comprising the swept blade of claim 1.

8. A swept wind turbine blade comprising:
   a blade body extending along a length between a root and a tip of the blade;
   a pitch axis extending through the root of the blade;
   a reference line defining a deviation from the pitch axis corresponding to a swept shape of the blade along its length;
   wherein the reference line comprises:
      a zero sweep at the root;
      a zero slope at the root;
      a positive curvature along a segment within 25% of the length from the root to the tip of the blade;
   wherein the reference line further comprises:
      a first curvature defined by a first function along a first portion of the length;
      a second curvature defined by a second function different from the first function along a second portion of the length adjoining the first function at a transition point;
   wherein the first curvature and the second curvature each terminate at the transition point and have an equivalent curvature.

* * * * *